United States Patent
Haines (10) Patent No.: US 7,886,772 B2
(45) Date of Patent: Feb. 15, 2011

(54) NOISE REDUCING FLUID PASSAGEWAYS FOR FLUID FLOW CONTROL DEVICES

(75) Inventor: Bradford Haines, Spanish Fork, UT (US)

(73) Assignee: Flowserve Management Company, Irving, TX (US)

(*) Notice: Subject to any disclaimer, the term of this patent is extended or adjusted under 35 U.S.C. 154(b) by 0 days.

(21) Appl. No.: 12/730,787

(22) Filed: Mar. 24, 2010

(65) Prior Publication Data

US 2010/0175768 A1   Jul. 15, 2010

Related U.S. Application Data

(62) Division of application No. 11/249,539, filed on Oct. 13, 2005, now Pat. No. 7,690,400.

(60) Provisional application No. 60/657,225, filed on Feb. 28, 2005.

(51) Int. Cl.
*F15D 1/02* (2006.01)
*F16K 47/08* (2006.01)

(52) U.S. Cl. ............ 138/42; 138/37; 251/127; 137/625.3; 137/625.33

(58) Field of Classification Search .......... 138/42, 138/37; 251/127; 137/625.3, 625.33, 625.37
See application file for complete search history.

(56) References Cited

U.S. PATENT DOCUMENTS

| | | |
|---|---|---|
| 1,234,251 A | 7/1917 | Zorzytzki |
| 3,513,864 A | 5/1970 | Self |
| 3,514,074 A | 5/1970 | Self |
| 3,529,628 A | 9/1970 | Cummins |
| 3,532,126 A | 10/1970 | Boothe |
| 3,688,800 A | 9/1972 | Hayner et al. |
| 3,722,854 A | 3/1973 | Parola |
| 3,780,767 A | 12/1973 | Borg et al. |
| 3,856,046 A | 12/1974 | Brown et al. |
| 3,856,049 A | 12/1974 | Scull |
| 3,894,716 A | 7/1975 | Barb |
| 3,899,001 A | 8/1975 | Orme |
| 3,917,222 A | 11/1975 | Kay et al. |
| 4,000,878 A | 1/1977 | Vick |
| 4,004,613 A | 1/1977 | Purton et al. |

(Continued)

OTHER PUBLICATIONS

International Search Report for International Application No. PCT/US2006/007065 dated Jun. 19, 2006 (5 pages).

(Continued)

*Primary Examiner*—Patrick F Brinson
(74) *Attorney, Agent, or Firm*—TraskBritt (57) ABSTRACT

Trim disk assemblies for use in fluid flow control devices include a first disk and a second disk. An elongated void is formed in a surface of each of the first disk and the second disk. The second disk is aligned with the first disk to provide fluid communication between the void of the first disk and the void of the second disk, the void of the first disk being offset or staggered from the void of the second disk. The void of the first disk and the void of the second disk at least partially define a fluid passageway having a cross-sectional area characterized by increases and decreases in cross-sectional area, which define an expansion/contraction mechanism of the fluid passageway.

13 Claims, 8 Drawing Sheets

U.S. PATENT DOCUMENTS

| | | |
|---|---|---|
| 4,007,908 A | 2/1977 | Smagghe et al. |
| 4,008,737 A | 2/1977 | Kluczynski et al. |
| 4,018,245 A | 4/1977 | Baumann |
| 4,050,479 A | 9/1977 | Baumann |
| 4,060,099 A | 11/1977 | Bates, Jr. |
| 4,068,683 A | 1/1978 | Self |
| 4,079,754 A | 3/1978 | Porter |
| RE29,714 E | 8/1978 | Hayner et al. |
| 4,105,048 A | 8/1978 | Self |
| 4,125,129 A | 11/1978 | Baumann |
| 4,127,146 A | 11/1978 | Self |
| 4,185,664 A | 1/1980 | Zabsky et al. |
| 4,221,037 A | 9/1980 | Seger |
| 4,267,045 A | 5/1981 | Hoof |
| 4,279,274 A | 7/1981 | Seger |
| 4,352,373 A | 10/1982 | Kay et al. |
| RE31,105 E | 12/1982 | Bates, Jr. |
| 4,397,331 A | 8/1983 | Medlar |
| 4,402,485 A | 9/1983 | Fagerlund |
| 4,407,327 A | 10/1983 | Hanson et al. |
| 4,410,430 A | 10/1983 | Hagler, Jr. |
| 4,429,714 A | 2/1984 | Hughes et al. |
| 4,456,033 A | 6/1984 | Kay et al. |
| 4,593,446 A | 6/1986 | Hayner |
| RE32,197 E | 7/1986 | Self |
| 4,693,450 A | 9/1987 | Paetzel |
| 4,938,450 A | 7/1990 | Tripp et al. |
| 5,357,793 A | 10/1994 | Jouwsma |
| 5,390,896 A | 2/1995 | Smirl |
| 5,687,763 A | 11/1997 | Steinke |
| 5,711,877 A | 1/1998 | Gonzalez |
| 5,732,738 A | 3/1998 | Graham |
| 5,769,122 A | 6/1998 | Baumann et al. |
| 5,772,178 A | 6/1998 | Bey |
| 5,803,119 A | 9/1998 | Steinke |
| 5,819,803 A | 10/1998 | Lebo et al. |
| 5,941,281 A | 8/1999 | Baumann et al. |
| 6,026,859 A | 2/2000 | Wears et al. |
| 6,039,076 A | 3/2000 | Hemme et al. |
| 6,095,196 A | 8/2000 | McCarty et al. |
| RE36,984 E | 12/2000 | Steinke |
| 6,161,584 A | 12/2000 | Hemme et al. |
| 6,244,297 B1 | 6/2001 | Baumann |
| 6,382,253 B1 | 5/2002 | McCarty et al. |
| 6,394,134 B1 | 5/2002 | Kwon |
| 6,416,268 B2 | 7/2002 | Gethmann |
| 6,615,874 B2 | 9/2003 | Thurston et al. |
| 6,718,633 B1 | 4/2004 | Glenn et al. |
| 7,690,400 B2 | 4/2010 | Haines |
| 2001/0015231 A1 | 8/2001 | Sand |
| 2003/0136454 A1 | 7/2003 | Thurston et al. |
| 2003/0226600 A1 | 12/2003 | Stares et al. |
| 2004/0011412 A1 | 1/2004 | Wears et al. |

OTHER PUBLICATIONS

Written Opinion for International Application No. PCT/US2006/007065 dated Jun. 19, 2006 (6 pages).

NOISE REDUCING FLUID PASSAGEWAYS FOR FLUID FLOW CONTROL DEVICES

CROSS-REFERENCE TO RELATED APPLICATIONS

This application is a divisional of U.S. patent application Ser. No. 11/249,539, filed Oct. 13, 2005, scheduled to issue as U.S. Pat. No. 7,690,400 on Apr. 6, 2010, which claims the benefit of Provisional Application Ser. No. 60/657,225, which was filed Feb. 28, 2005, and entitled "Noise Reducing Fluid Passageways For Fluid Flow Control Devices," the entire disclosure of each of which is hereby incorporated herein by this reference.

FIELD OF THE INVENTION

The present invention relates to fluid flow control devices and, more specifically, to an improved noise reduction mechanism for a fluid flow control device. The present invention also relates to trim disk assemblies for use in such fluid flow control devices.

BACKGROUND OF THE INVENTION

In many areas of industry, it is often necessary to reduce the pressure of fluids (both liquids and gases) within a pipeline. Fluid flow control valve systems are often used for this purpose. Various designs for fluid flow control valves have been presented in the art. For example, a plurality of tortuous fluid flow paths may be provided within a fluid flow control valve. As fluid passes through the tortuous fluid flow paths, the fluid is caused to change direction many times. Furthermore, as the fluid travels through the tortuous fluid flow paths, the overall cross-sectional area of the fluid flow path may increase to provide a decrease in the velocity of the fluid within the flow path. These devices are commonly referred to as "tortuous path trim devices."

Tortuous path trim devices have been provided that include a plurality of substantially planar disks stacked on top of one another to provide a hollow, cylindrical structure. Such structures are commonly referred to as "valve trim disk assemblies." Each disk generally includes a plurality of voids formed through the disk. The disks may be aligned and stacked together such that a plurality of continuous, tortuous fluid paths are provided by the voids in the disks that extend from the central region of the hollow, cylindrical valve trim disk assembly to the exterior of the valve trim disk assembly.

A valve trim disk assembly is typically provided within a body of a fluid flow control valve. The body of the fluid flow control valve is configured to direct the fluid from an inlet towards the hollow, cylindrical valve trim disk assembly. The valve also may be configured to direct fluid passing through the valve trim disk assembly to the exterior thereof towards a fluid outlet. The fluid flow control valve may include a piston configured to be inserted into the central region of the valve trim disk assembly, thereby interrupting fluid flow through the valve trim disk assembly and closing the valve.

Pressurized fluids contain stored mechanical potential energy. The valve trim disk assembly dissipates this energy by reducing the pressure and velocity of the fluid. As the fluid flows through the fluid pathways, the fluid flow may be turbulent. Turbulent fluid has associated pressure and velocity fluctuations that act upon the structural elements of the pipes and fluid control devices in which the fluid is flowing. These pressure and velocity fluctuations cause vibrations and noise. In many applications, noise is an undesirable or unacceptable characteristic of a fluid flow control device.

As a result, valve trim assemblies have been presented in the art having design features intended to suppress noise generated therein. Nonetheless, a substantially silent valve has yet to be discovered and incremental improvements in noise suppression are desirable.

BRIEF SUMMARY OF THE INVENTION

The present invention, in a number of representative embodiments, provides a cost effective means by which pressure reducing components in a fluid flow control device may be improved so as to reduce transmitted noise.

In accordance with one embodiment of the present invention, a trim disk assembly for use in a device for controlling fluid flow includes a substantially planar first disk and a substantially planar second disk. The first disk has a first major surface and a second major surface. The first disk further includes an elongated void formed at least partially through the first disk in one of the first major surface and the second major surface thereof. The second disk is disposed adjacent the first disk and also has a first major surface and a second major surface. The second disk further includes an elongated void formed at least partially through the second disk in one of the first major surface and the second major surface thereof. The void in the second disk has a shape and size substantially similar to a shape and size of the void in the first disk. The second disk is aligned with the first disk to provide fluid communication between the void of the first disk and the void of the second disk. The void of the first disk is offset from the void of the second disk. The void of the first disk and the void of the second disk together at least partially define a fluid passageway having a cross section characterized by increases and decreases in cross-sectional area defining an expansion/contraction mechanism of the elongated fluid passageway.

In accordance with another embodiment of the present invention, a device for controlling fluid flow includes a fluid inlet, a fluid outlet, and a trim disk assembly configured to provide a pressure differential between fluid disposed at the fluid inlet and fluid disposed at the fluid outlet. The trim disk assembly includes a substantially planar first disk comprising a first major surface and a second major surface. The first disk further includes an elongated void formed at least partially through the first disk in one of the first major surface and the second major surface thereof. The second disk is disposed adjacent the first disk and includes a first major surface and a second major surface. The second disk also further includes an elongated void formed at least partially through the second disk in one of the first major surface and the second major surface thereof. The void of the second disk has a shape and size substantially similar to a shape and size of the void in the first disk. The second disk is aligned with the first disk to provide fluid communication between the void of the first disk and the void of the second disk. The void of the first disk is offset from the void of the second disk. The void of the first disk and the void of the second disk together at least partially define a fluid passageway having a cross-sectional area characterized by increases and decreases in cross-sectional area defining an expansion/contraction mechanism of the elongated fluid passageway.

In yet another embodiment, the present invention includes a device for controlling fluid flow that includes a fluid inlet, a fluid outlet, and a plurality of fluid passageways extending between the fluid inlet and the fluid outlet. Each fluid passageway has a cross-sectional area characterized by at least two abutting, offset shapes. The cross-sectional area is completely bounded by a plurality of sides defined by the walls of the fluid passageway. Two sides of the plurality of sides meet at a first point, which defines the vertex of a first angle between the sides meeting at the first point. Two of the sides of the plurality of sides meet at a second point, which defines the vertex of a second angle between the sides meeting at the second point. The first angle is equal to the second angle, and the first angle and the second angle each exceed 180 degrees.

The features, advantages, and alternative aspects of the present invention will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Although the foregoing description contains many specifics, these should not be construed as limiting the scope of the present invention, but merely as providing illustrations of some representative embodiments. Similarly, other embodiments of the invention may be devised that do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims, are to be embraced thereby.

Figure 1:
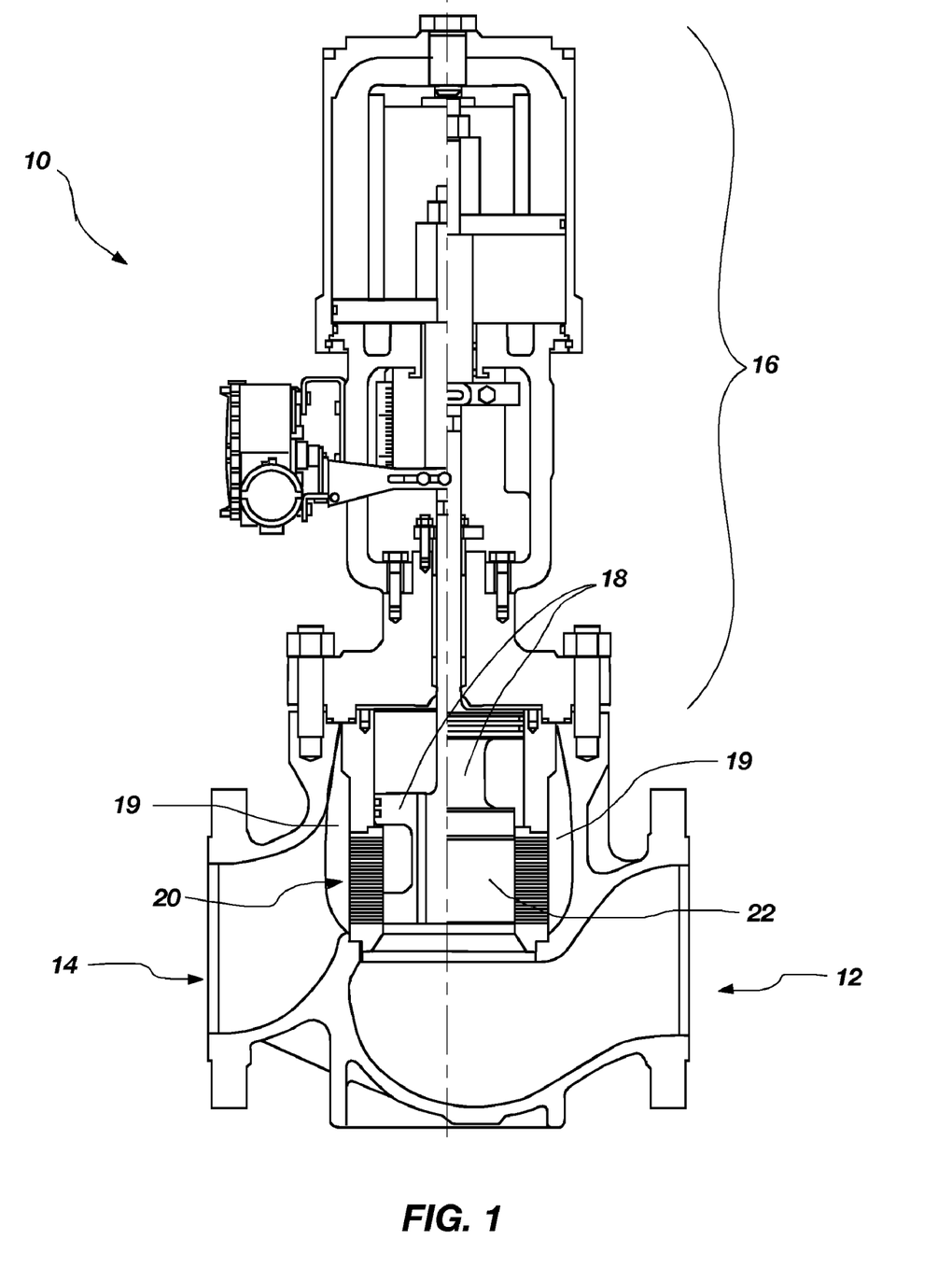
FIG. 1 is a vertical cross-sectional view of a representative fluid flow control device that incorporates teachings of the present invention.

FIG. 1 is a vertical cross section of a representative fluid flow control device 10 that embodies teachings of the present invention. The fluid flow control device 10 includes a fluid inlet 12, a fluid outlet 14, and a trim disk assembly 20. Furthermore, the fluid flow control device 10 may include a piston mechanism 16 configured to selectively interrupt fluid communication between the fluid inlet 12 and the fluid outlet 14. During operation of fluid flow control device 10, fluid pressure at inlet 12 may be higher than fluid pressure at outlet 14.

The piston mechanism 16 is shown in FIG. 1 in split view, in two different positions. On the left side of FIG. 1 the piston mechanism 16 is shown in a closed, first selected position in which fluid communication between the fluid inlet 12 and the fluid outlet 14 has been physically interrupted by piston 18. On the right side of FIG. 1 the piston mechanism 16 is shown in an open, second selected position in which the piston 18 is retracted to provide fluid communication between the fluid inlet 12 and the fluid outlet 14. When piston mechanism 16 is in this open, second position, fluid is permitted to flow from the fluid inlet 12, upward into an interior void 22 of the trim disk assembly 20 in response to a pressure differential provided between the fluid inlet 12 and the fluid outlet 14. As will be described in detail subsequently herein, fluid communication is provided through fluid passageways within the trim disk assembly 20 to the exterior thereof and the fluid outlet 14. A space or gallery 19 within the body of the fluid flow control device 10 may surround the trim disk assembly 20 to receive or collect fluid passing through the trim disk assembly 20. The space or gallery 19 may be configured to channel fluid towards the fluid outlet 14.

The trim disk assembly 20 shown in FIG. 1 may comprise a plurality of substantially planar disks stacked adjacent to one another to provide a three-dimensional structure. Furthermore, the trim disk assembly 20 may comprise a plurality of substantially identical sets of substantially planar disks stacked adjacent one another, the sets of disks being stacked adjacent one another to provide a three-dimensional structure.

Figure 2:
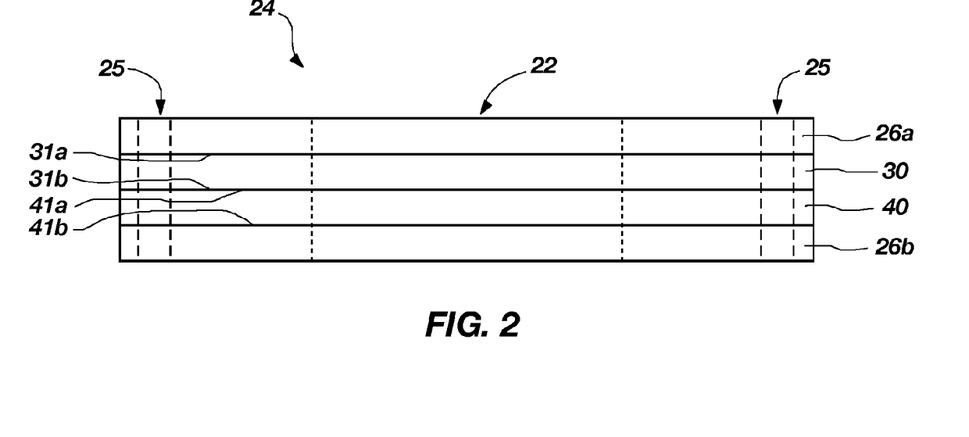
FIG. 2 is a vertical side view of one set of trim disks that may be used as part of a representative trim disk assembly that embodies further teachings of the present invention in the fluid flow control device shown in FIG. 1.

FIG. 2 is a side view of a representative set 24 of substantially planar disks stacked adjacent to one another. A plurality of sets 24 may be stacked and secured adjacent to one another to provide the trim disk assembly 20 shown in FIG. 1. As seen in FIG. 2, the set 24 of disks may include a first separator disk 26a, a first fluid passageway disk 30, a second fluid passageway disk 40, and a second separator disk 26b. The first fluid passageway disk 30 and the second fluid passageway disk 40 may be disposed and secured adjacent to one another. The first fluid passageway disk 30 may be substantially planar and may have a first major surface 31a and a second major surface 31b. Similarly, the second fluid passageway disk 40 may be substantially planar and may have a first major surface 41a and a second major surface 41b.

The first separator disk 26a may be provided and secured adjacent to the first fluid passageway disk 30 on the first major surface 31a thereof opposite the second fluid passageway disk 40, and the second separator disk 26b may be provided and secured adjacent to the second fluid passageway disk 40 on the second major surface 41b thereof opposite the first fluid passageway disk 30. The first separator disk 26a, the first fluid passageway disk 30, the second fluid passageway disk 40, and the second separator disk 26b may be aligned with and secured to one another by providing bolts or pins (not shown) through holes 25, which may be provided through each of the various disks at selected locations thereon. Alternatively, the disks may be secured to one another by methods other than bolts or pins, such as, for example, by brazing or welding.

Each of the disks of the set 24 shown in FIG. 2 will now be described in further detail.

Figure 3:
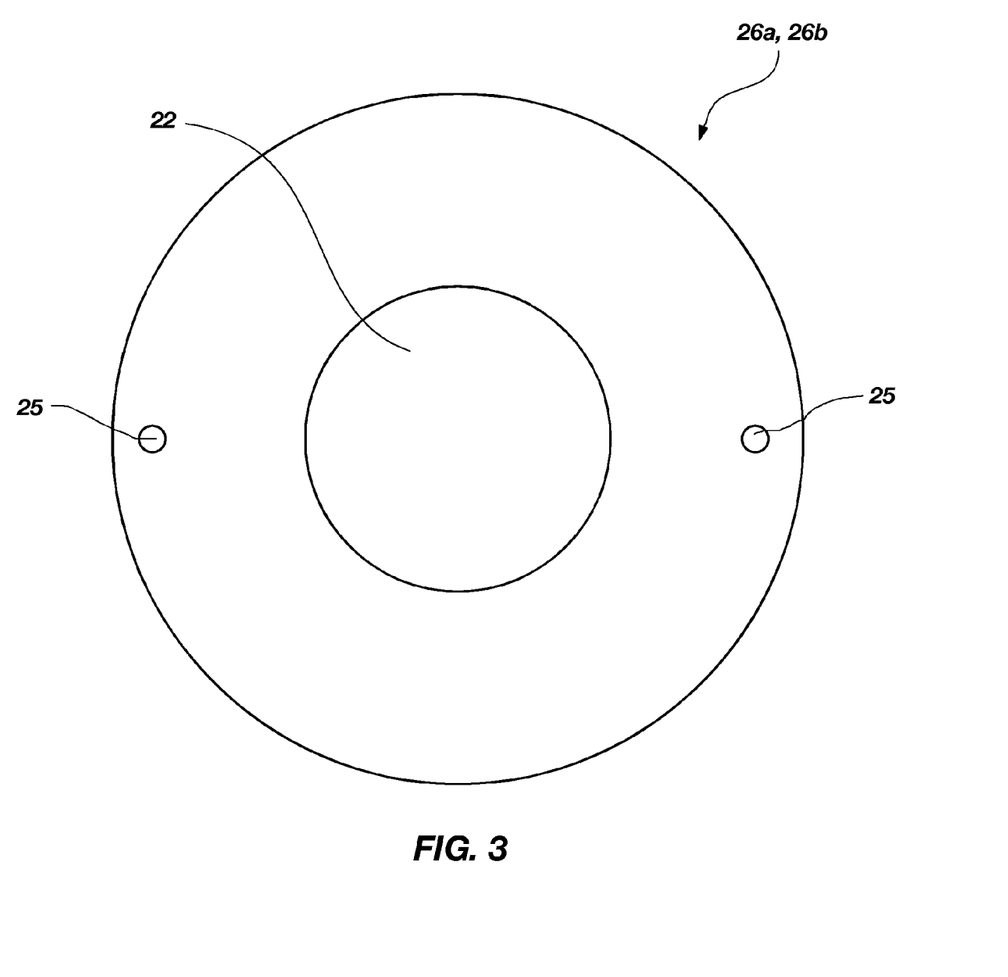
FIG. 3 is a plan view of a representative separator disk, as may be incorporated into a set of trim disks.

The first separator disk 26a and the second separator disk 26b may be identical. FIG. 3 is a plan view of a particular embodiment of the first separator disk 26a and the second separator disk 26b. As seen therein, the first separator disk 26a and the second separator disk 26b each may be substantially planar and may have a circular shape. As previously discussed, holes 25 may be provided through the first separator disk 26a and the second separator disk 26b at selected locations thereon. A larger hole may be provided at the center of each of the first separator disk 26a and the second separator disk 26b to provide a portion of the interior void 22 within the trim disk assembly 20 (shown in FIG. 1).

Figure 4:
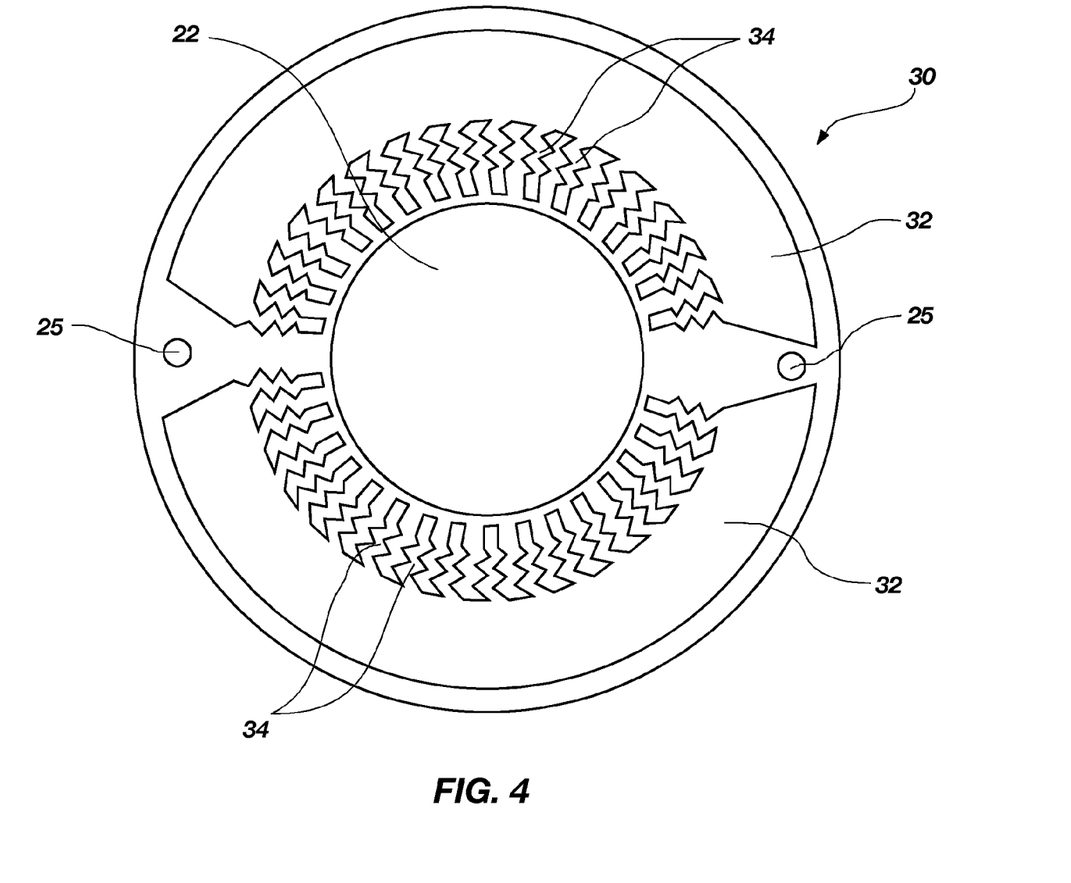
FIG. 4 is a plan view of a representative first trim disk of the set of trim disks shown in FIGS. 1 and 2.

FIG. 4 is a plan view of a representative first fluid passageway disk 30 that embodies teachings of the present invention. As previously discussed with reference to FIG. 2, holes 25 may be provided through the first fluid passageway disk 30 at selected locations thereon. A larger hole may be provided at the center of the first fluid passageway disk 30 to provide a portion of the interior void 22 within the trim disk assembly 20 (shown in FIG. 1). The first fluid passageway disk 30 also may include at least one void 32 having a substantially annular shape. Furthermore, the first fluid passageway disk 30 includes a plurality of elongated channels or voids 34. The elongated voids 34 may extend in a generally radial direction between a region proximate to the interior void 22 and the void 32. Each elongated void 34 may include at least two straight, elongated sections joined end-to-end and oriented at an angle relative to one another to provide a plurality of V-shaped turns in the elongated void 34.

For example, each elongated void 34 may include four or more straight, elongated sections joined end-to-end and oriented at an angle relative to one another to provide three or more V-shaped turns in the elongated void 34. In this configuration, each elongated void 34 may zig-zag laterally back and forth as the elongated void 34 extends in a generally radial direction. Each elongated void 34 may be continuous with the void 32. Moreover, the width of each elongated void 34 may increase as the void extends in the radially outward direction.

In alternative embodiments of the present invention, the elongated voids 34 may include changes in direction other than zig-zag configurations or they may be linear.

Figure 5:
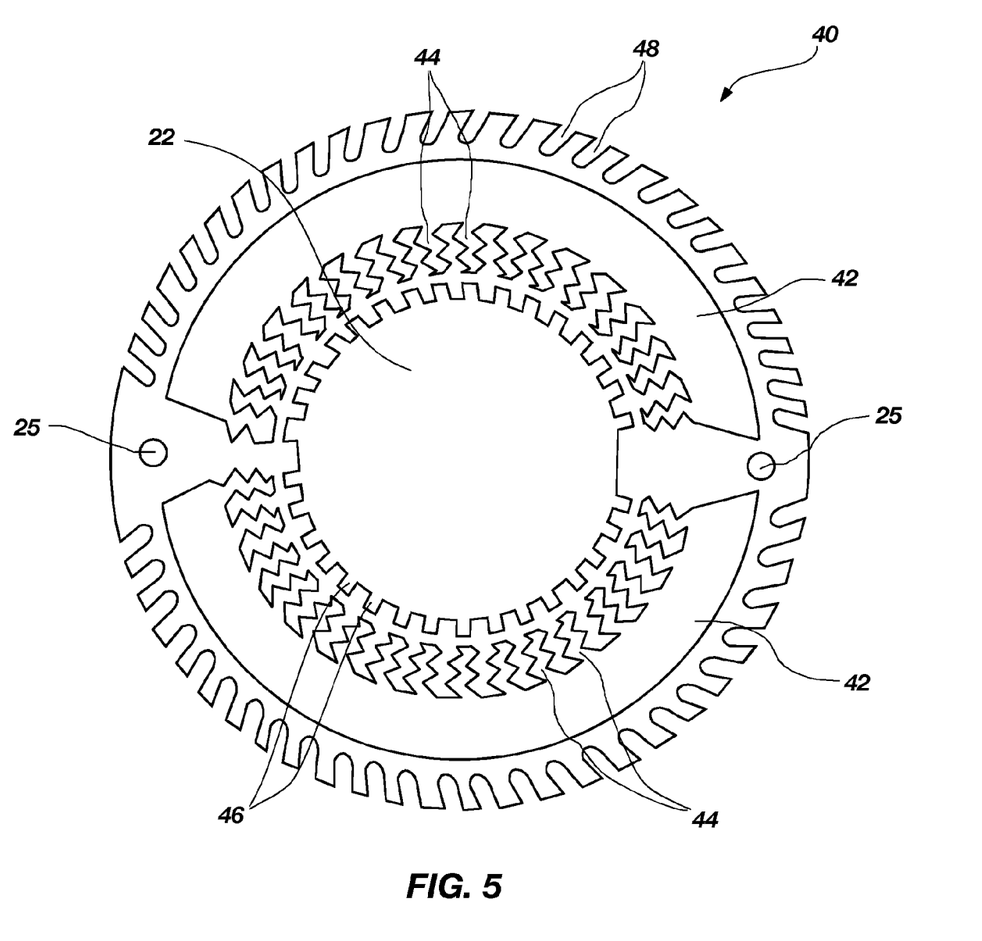
FIG. 5 is a plan view of a representative second trim disk of the set of trim disks shown in FIGS. 1 and 2.

Referring again to FIG. 2, the void 32 and the elongated voids 34 may extend through the first fluid passageway disk 30 from the first major surface 31a to the second major surface 31b thereof. Alternatively, the void 32 and the elongated voids 34 may extend only partially through the first fluid passageway disk 30 into the second major surface 31b thereof FIG. 5 is a plan view of a representative embodiment of the second fluid passageway disk 40. As previously discussed with reference to FIG. 2, holes 25 may be provided through the second fluid passageway disk 40 at various selected locations thereon. A larger hole may be provided at the center of the second fluid passageway disk 40 to form a portion of the interior void 22 within the trim disk assembly 20 (shown in FIG. 1). The second fluid passageway disk 40 may also include at least one void 42 having a substantially annular shape. Furthermore, the second fluid passageway disk 40 includes a plurality of elongated channels or voids 44 that each have a shape and size substantially similar to the shape and size of the elongated channels or voids 34 of the first fluid passageway disk 30 previously described in relation to FIG. 4.

For example, the elongated voids 44 may extend in a generally radial direction between a region proximate the interior void 22 and the void 42. Each elongated void 44 may include at least two straight, elongated sections joined end-to-end and oriented at an angle relative to one another to provide a plurality of V-shaped turns in the elongated void 44. For example, each elongated void 44 may include four or more straight, elongated sections joined end-to-end and oriented at an angle relative to one another to provide three or more V-shaped turns in the elongated void 44. In this configuration, each elongated void 44 may zig-zag laterally back and forth as the elongated void 44 extends in a generally radial direction. Each elongated void 44 may be continuous with the void 42. Moreover, the width of each elongated void 44 may increase as the void extends in the radially outward direction.

Referring again to FIG. 2, the void 42 and the elongated voids 44 may extend through the first fluid passageway disk 40 from the first major surface 41a to the second major surface 41b thereof. Alternatively, the void 42 having a substantially annular shape and the elongated voids 44 may extend only partially through the first fluid passageway disk 40 into the first major surface 41a thereof.

The second fluid passageway disk 40 may also include a plurality of fluid inlet voids 46 and a plurality of fluid outlet voids 48. The fluid inlet voids 46 may be continuous with the larger void at the center of the disk 40 that forms a portion of the interior void 22 of the trim disk assembly 20. Each fluid inlet void 46 may be associated with and correspond to one elongated void 44. In this configuration, each fluid inlet void 46 may be configured to allow fluid to pass into passageways (not shown in FIG. 5) within the trim disk assembly 20 from the interior void 22, and each fluid outlet void 48 may be configured to allow fluid to pass out from the trim disk assembly 20 to the exterior thereof. The operation of the trim disk assembly 20 will be described in further detail below.

Figure 6:
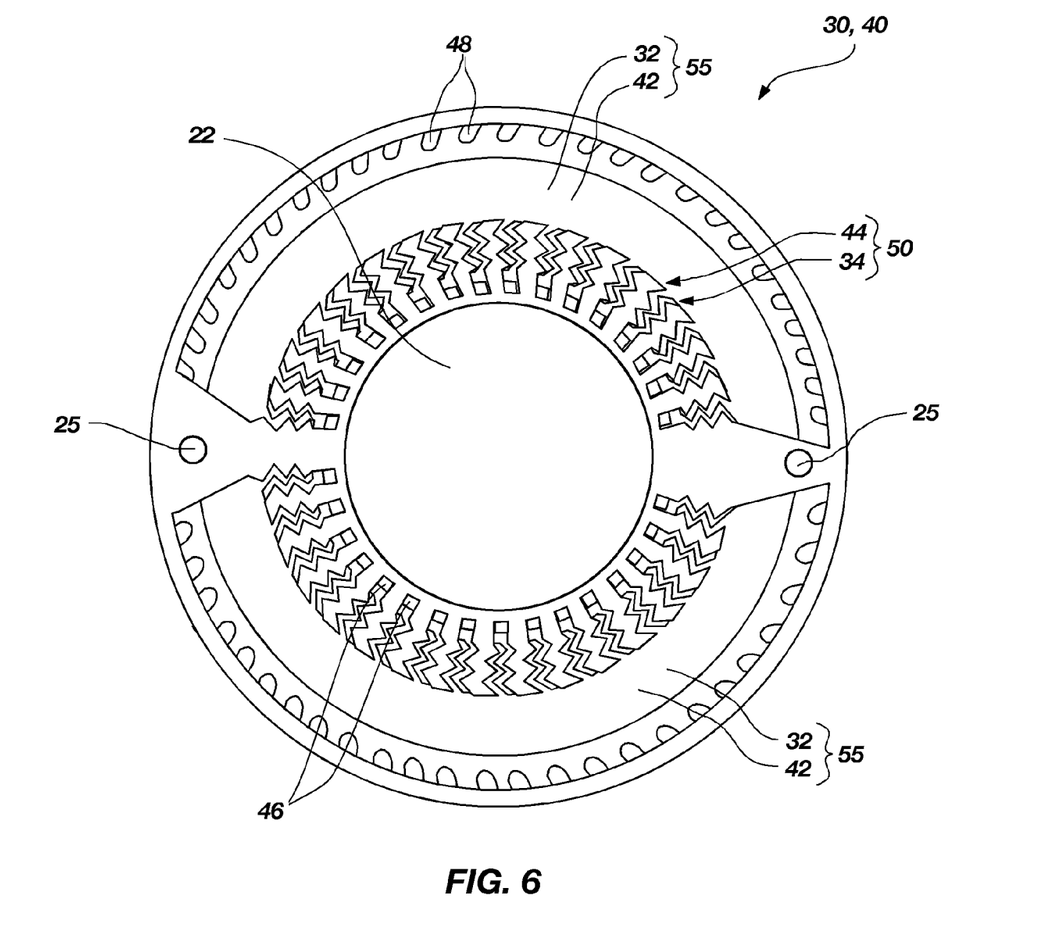
FIG. 6 is a plan view of the first trim disk shown in FIG. 3 positioned adjacent to and aligned with the second trim disk shown in FIG. 4.

FIG. 6 is a plan view illustrating the first fluid passageway disk 30 shown in FIG. 4 positioned adjacent to and aligned with the second fluid passageway disk 40 shown in FIG. 5. The second fluid passageway disk 40 is shown positioned beneath the first fluid passageway disk 30 to clearly illustrate the alignment and interaction between features in each of the respective disks.

As can be seen in FIG. 6, the elongated voids 34 of the first fluid passageway disk 30 and the elongated voids 44 of the second fluid passageway disk 40 are staggered or offset relative to one another. Fluid communication is provided between the elongated voids 34 and the elongated voids 44. The elongated voids 34 and the elongated voids 44, together, at least partially define a fluid passageway 50.

The annular voids 32 of the first fluid passageway disk 30 and the annular voids 42 of the second fluid passageway together define acoustic chambers 55, which also have an annular shape. The acoustic chambers 55 may be configured to reduce, attenuate, eliminate, redirect, damp, or otherwise defeat acoustic disturbances generated in the fluid passageways 50. The acoustic chambers 55 may be configured to incorporate many specific features that defeat acoustic disturbances. For example, the acoustic chambers 55 may be configured to resonate one or more frequencies of sound waves corresponding to frequencies of sound generated within the fluid passageways 50. Furthermore, the tuned frequencies may be about 180 degrees out of phase with at least some sound entering the acoustic chambers 55.

When the piston 18 of the fluid flow control device 10 is retracted, as shown on the right side of FIG. 1, and a pressure differential is applied between the fluid inlet 12 and the fluid outlet 14, fluid may flow into the interior void 22 of the trim disk assembly 20. Fluid communication is provided between the fluid passageways 50 and the interior void 22 of the trim disk assembly 20 by the fluid inlet voids 46 of the second fluid passageway disk 40. Fluid flowing through the fluid passageways 50 in a radially outward direction enters the acoustic chambers 55. Fluid communication is provided between the acoustic chambers 55 and the exterior of the trim disk assembly 20 by the fluid outlet voids 48 of the second fluid passageway disk 40.

The fluid outlet voids 48 may be configured as noise frequency-shifting passages that increase the sonic frequency of acoustic disturbances associated with fluid flowing through the trim disk assembly 20. The cross sectional area and length of the fluid outlet voids may be such that any acoustic disturbances transmitted through the fluid outlet voids 48 have a significantly higher frequency than the acoustic disturbances associated with the remainder of the fluid flow control device 10.

Figure 7:
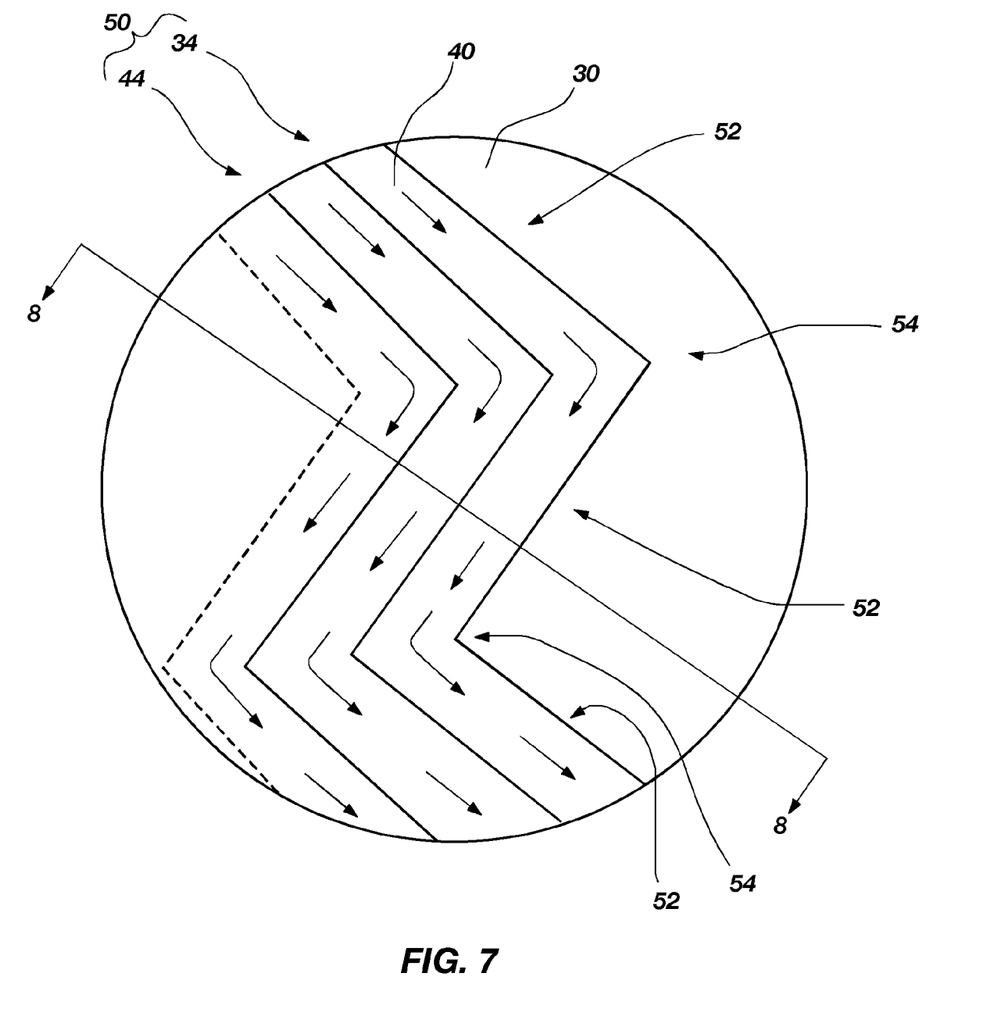
FIG. 7 is an enlarged partial plan view of a portion of a fluid passageway shown in FIG. 6.

FIG. 7 is an enlarged partial plan view of a portion of the fluid passageway 50 shown in FIG. 6. Fluid is shown flowing through the fluid passageway 50 that is provided by an elongated void 34 of the first fluid passageway disk 30 and an elongated void 44 of the second fluid passageway disk 40. Fluid may flow through the fluid passageway 50 from the interior void 22 towards the exterior of the trim disk assembly 20 in a generally radially outward direction represented by the directional arrows shown within the fluid passageway 50. As seen in FIG. 7, the fluid passageway 50 may include a plurality of straight, elongated sections 52 joined end-to-end and oriented at an angle relative to one another to provide a plurality of V-shaped turns 54 in the fluid passageway 50.

In this configuration, the elongated fluid passageway 50 has a cross-sectional area characterized by increases and decreases in the size of the cross-sectional area along the length of the fluid passageway 50. As fluid flows through the fluid passageway 50, the size of the cross-sectional area of the fluid passageway 50 increases going into a V-shaped turn 54, thereby causing expansion of the fluid. As fluid flows out from a V-shaped turn 54, the size of the cross-sectional area of the fluid passageway 50 decreases, thereby causing contraction of the fluid. In this manner, a fluid expansion/contraction mechanism may be provided by the fluid passageway 50.

Moreover, the fluctuations in cross-sectional area of the fluid passageway 50 may be configured to provide a generally increasing cross-sectional area in the fluid passageway in the radially outward direction. In this configuration, the velocity of fluid flowing through the fluid passageway 50 may gradually decrease as the fluid flows in the radially outward direction. In this manner, a fluid velocity control mechanism may be provided by the fluid passageway 50.

In the fluid passageway 50 shown in FIGS. 6 and 7, the velocity control mechanism and the expansion/contraction mechanism are defined by a common portion of the fluid passageway 50. In alternative fluid passageways that embody teachings of the present invention, the velocity control mechanism and the expansion/contraction mechanism may be provided at distinct sections of a fluid passageway.

Fluid passageways that embody teachings of the present invention and include substantially V-shaped bends (such as the fluid passageway 50 shown in FIG. 7) or other changes in fluid flow path may cause individual fluid molecules to move in many different and unpredictable directions as a result of, among other influences, pressure, fluid velocity, geometrical features and dimensions of the passageway, surface effects and turbulence. The fluid will, nevertheless, be channeled generally along the fluid passageways in a path generally away from regions of higher fluid pressure and toward regions of lower fluid pressure. Thus, "general path of fluid flow" as used herein refers to the path generally defined by the continuous portion of the fluid passageway 50 as shown by the directional arrows in FIG. 7.

While the particular embodiments described herein include fluid passageways having substantially V-shaped bends or turns, such as the V-shaped turns 54 shown in FIG. 7, it is understood that other embodiments of the present invention may include fluid passageways having various other configurations of bends or turns, such as, for example, arcuate bends.

Figure 8:
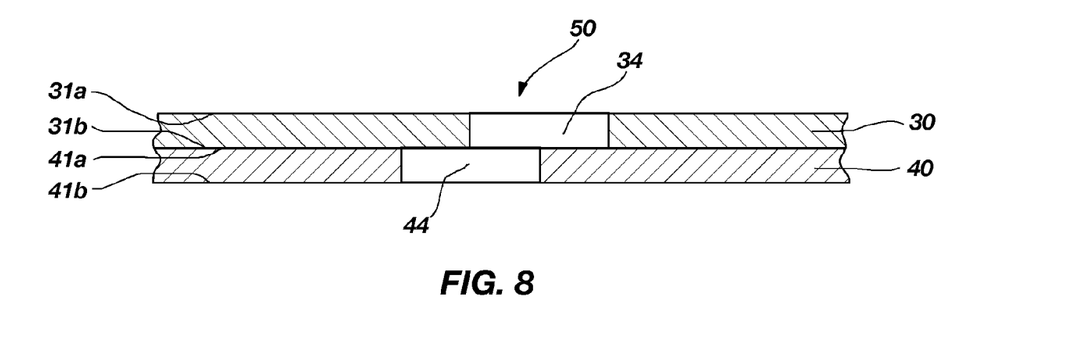
FIG. 8 is partial cross-sectional view of the portion of a fluid passageway shown in FIG. 7 taken along section line 8-8 therein.

FIG. 8 is a partial cross-sectional view of the portion of a fluid passageway shown in FIG. 7 taken along section line 8-8 therein. As illustrated in FIG. 8, the elongated void 34 in the first fluid passageway disk 30 and the elongated void 44 in the second fluid passageway disk 40 each may have a cross-sectional area having a rectangular shape. Furthermore, the elongated void 34 in the first fluid passageway disk 30 may extend through the disk 30 from the first major surface 31a to the second major surface 31b thereof. Similarly, the elongated void 44 in the second fluid passageway disk 40 may extend through the disk 40 from the first major surface 41a to the second major surface 41b thereof.

Figure 9:
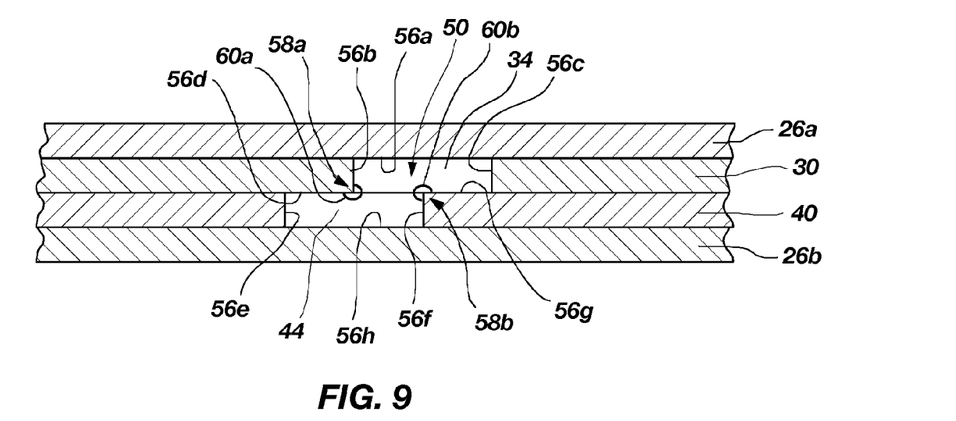
FIG. 9 is partial cross-sectional view like that of FIG. 8 further illustrating separator disks positioned above and below the adjacent trim disks.

FIG. 9 is a partial cross-sectional view like that of FIG. 8 further illustrating the first separator disk 26a provided and secured adjacent to the first fluid passageway disk 30 on the side thereof opposite the second fluid passageway disk 40, and the second separator disk 26b provided and secured adjacent to the second fluid passageway disk 40 on the side thereof opposite the first fluid passageway disk 30. As illustrated in FIG. 9, a continuous portion of the fluid passageway 50 may have an undivided cross-section that can be defined by at least two adjoining, staggered voids (defined by elongated void 34 and elongated void 44 respectively). The voids may have a substantially rectangular shape.

The fluid passageway 50 may comprise a plurality of walls at least partially defined by portions of surfaces of each of the first separator disk 26a, the second separator disk 26b, the first fluid passageway disk 30, and the second fluid passageway disk 40. For example, wall 56a of the fluid passageway 50 may be provided by a portion of a surface of the first separator disk 26a. Walls 56b, 56c, and 56d may be provided by portions of surfaces of the first fluid passageway disk 30. Walls 56e, 56f, and 56g may be provided by portions of surfaces of the second fluid passageway disk 40. Finally, wall 56h may be provided by a portion of a surface of the second separator disk 26b.

The cross-sectional area of the fluid passageway 50 is completely bounded by sides defined by the walls 56a-56h of the fluid passageway 50. The sides of the cross-sectional area defined by the walls 56b and 56d meet at a first point 58a, which defines the vertex of a first angle 60a. The sides of the cross-sectional area defined by the walls 56f and 56g meet at a second point 58b, which defines the vertex of a second angle 60b. The first angle 60a may be equal to the second angle 60b, and the first angle 60a and the second angle 60b each may exceed 180°. For example, the first angle 60a and the second angle 60b each may be about 270°. The first angle 60a may be oppositely oriented relative to the second angle 60b.

Figure 10A:
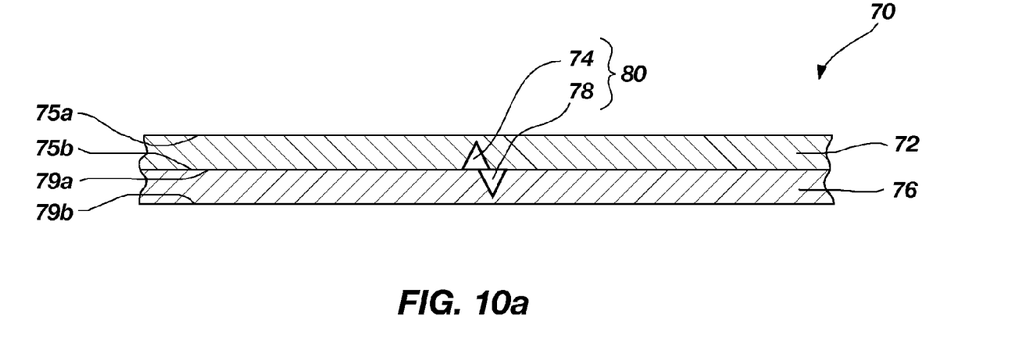
FIGS. 10a-10c illustrate partial cross-sectional views of alternative fluid passageways that may be provided in representative trim disk assemblies that embody teachings of the present invention.
Figure 10B:
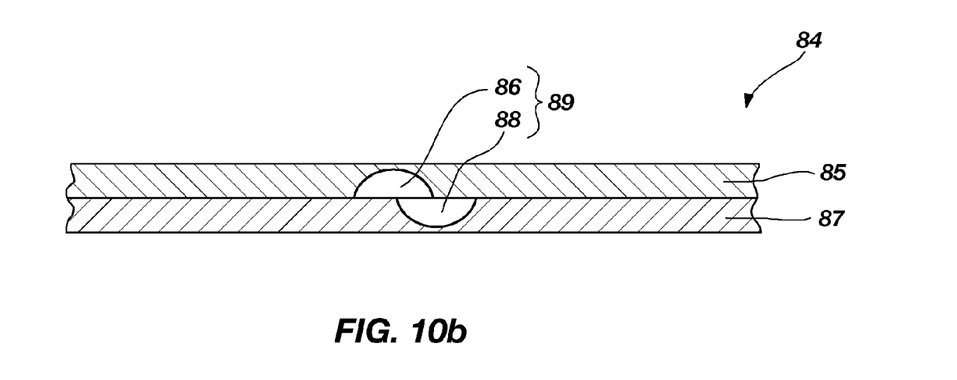
Figure 10C:
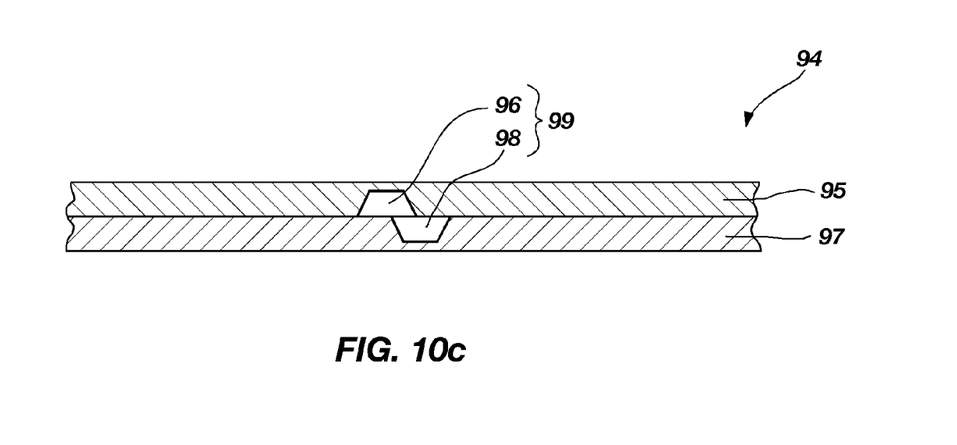

In alternative trim disk assemblies that embody teachings of the present invention, elongated channels or voids may be machined only partially through fluid passageway disks so that bounded continuous portions of fluid passageways are formed upon stacking only fluid passageway disks, thereby eliminating the need for separator disks (such as the separator disks 26a and 26b shown in FIG. 3). FIGS. 10a-10c illustrate partial cross-sectional views of alternative fluid passageways that may be provided in representative trim disk assemblies that embody teachings of the present invention.

FIG. 10a illustrates another representative trim disk set 70 that embodies teachings of the present invention. The trim disk set 70 includes a first fluid passageway disk 72, which is substantially similar to the first fluid passageway disk 30 previously described in relation to FIG. 4, and includes a first major surface 75a and a second major surface 75b. The trim disk assembly 70 also includes a second fluid passageway disk 76, which is substantially similar to the second fluid passageway disk 40 previously described herein in relation to FIG. 5, and includes a first major surface 79a and a second major surface 79b. The first fluid passageway disk 72 may be aligned with and secured to the second fluid passageway disk 76 such that the second major surface 75b of the first fluid passageway disk 72 is adjacent to and abuts with the first major surface 79a of the second fluid passageway disk 76.

The first fluid passageway disk 72 may include an elongated void 74 having a cross-sectional area of triangular shape formed partially through the disk 72 in the second major surface 75b thereof. The second fluid passageway disk 76 may include an elongated void 78 having a cross-sectional area of triangular shape formed partially through the disk 76 in the first major surface 79a thereof. The first fluid passageway disk 72 and the second fluid passageway disk 76 may be aligned such that the elongated void 74 is staggered or offset from the elongated void 78. Furthermore, fluid communication may be provided between the elongated void 74 and the elongated void 78.

The elongated void 74 and the elongated void 78 together define a fluid passageway 80. The fluid passageway 80 may have a cross-sectional area characterized by increases and decreases in cross-sectional area, the increases and decreases in cross-sectional area may define an expansion/contraction mechanism of the elongated fluid passageway 80 in the same manner as that previously described in relation to the fluid passageway 50 shown in FIG. 7. By way of example and not limitation, the fluid passageway 80 may include a plurality of straight, elongated sections (not shown) joined end-to-end and oriented at an angle relative to one another to provide a plurality of V-shaped turns (not shown) in the fluid passageway 80.

In this configuration, separator disks like those shown in FIG. 3 are not needed to at least partially define the fluid passageway 80. A plurality of trim disk sets identical to trim disk set 70 may be stacked together to provide a trim disk assembly that embodies teachings of the present invention.

FIG. 10b illustrates yet another representative trim disk set 84 that embodies teachings of the present invention. The trim disk set 84 may be substantially identical to the trim disk set 70 previously described in relation to FIG. 10a and includes a first fluid passageway disk 85, a second fluid passageway disk 87, and a fluid passageway 89. The first fluid passageway disk 85 may include an elongated void 86 having a cross-sectional area of semi-circular shape formed partially through the disk 85. The second fluid passageway disk 87 may include an elongated void 88 having a cross-sectional area of semi-circular shape formed partially through the disk 87. The first fluid passageway disk 85 and the second fluid passageway disk 87 may be aligned such that the elongated void 86 is staggered or offset from the elongated void 88. The elongated void 86 and the elongated void 88 together define the fluid passageway 89.

FIG. 10c illustrates yet representative trim disk set 94 that embodies teachings of the present invention. The trim disk set 94 may be substantially identical to the trim disk set 70 previously described in relation to FIG. 10a and includes a first fluid passageway disk 95, a second fluid passageway disk 97, and a fluid passageway 99. The first fluid passageway disk 95 may include an elongated void 96 having a cross-sectional area of trapezoidal shape formed partially through the disk 95. The second fluid passageway disk 97 also may include an elongated void 98 having a cross-sectional area of trapezoidal shape formed partially through the disk 97. The first fluid passageway disk 95 and the second fluid passageway disk 97 may be aligned such that the elongated void 96 is staggered or offset from the elongated void 98. The elongated void 96 and the elongated void 98 together define the fluid passageway 99.

Experimentation has shown that fluid passageways having a cross-sectional area as described herein transmit less noise along their length than do passageways of equal cross-sectional area defining a simple, regular geometric shape such as a square or rectangle, when the fluid passageways are operating within a fluid flow control device. Therefore, trim disk sets, trim disk assemblies, and fluid flow control devices as described herein may be used to effectively generate less noise or to transmit less noise than previously used devices.

Additionally, it will be appreciated that noise-reducing fluid passageways having cross sections as described herein may be provided in a variety of alternative known designs for trim disk assemblies or other fluid pressure-reducing, fluid noise-reducing and/or fluid energy-dissipating structures. For example, passageways that embody teachings of the present invention may be used in so-called tortuous fluid passageways, dividing and/or converging passageways, expanding and/or contracting passageways, and bending and/or turning passageways. Furthermore, noise-reducing fluid passageways having cross sections as described herein may be incorporated into fluid flow control devices other than fluid valves, including any fluid flow control device that incorporates fluid pressure-reducing and/or fluid energy dissipating structures. The performance of such devices also may be improved by teachings of the present invention.

Although the foregoing description contains many specifics, these are not to be construed as limiting the scope of the present invention, but merely as providing certain representative embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A device for controlling fluid flow comprising:
   a fluid inlet;
   a fluid outlet;
   a trim disk assembly configured to provide a pressure differential between fluid disposed at the fluid inlet and fluid disposed at the fluid outlet, the trim disk assembly comprising:
      a substantially planar first disk comprising a first major surface and a second major surface, the first disk including an elongated void formed at least partially through the first disk in one of the first major surface and the second major surface thereof;
      a substantially planar second disk disposed adjacent the substantially planar first disk, the second disk comprising a first major surface and a second major surface, the second disk including an elongated void formed at least partially through the second disk in one of the first major surface and the second major surface thereof, the void of the second disk having a shape and size substantially similar to a shape and size of the void of the first disk, the second disk being aligned with the first disk to provide fluid communication between the void of the first disk and the void of the second disk, the void of the first disk being offset from the void of the second disk;

wherein the void of the first disk and the void of the second disk together at least partially define a fluid passageway; and at least two substantially planar spacer disks, the first disk and the second disk being disposed between the at least two spacer disks, the void in the first disk extending through the first disk from the first major surface to the second major surface of the first disk, the void in the second disk extending through the second disk from the first major surface to the second major surface of the second disk, wherein at least a portion of a surface of a first spacer disk and at least a portion of a surface of a second spacer disk at least partially define the fluid passageway.

2. A device for controlling fluid flow as recited in claim 1, wherein the void of the first disk and the void of the second disk each have a cross-sectional area of one of a rectangular, triangular, trapezoidal, and semicircular shape.

3. A device for controlling fluid flow as recited in claim 1, wherein the void of the first disk and the void of the second disk each comprise at least two straight, elongated sections joined end-to-end and oriented at an angle relative to one another to provide a plurality of turns defining changes in fluid flow direction within the fluid passageway.

4. A device for controlling fluid flow as recited in claim 1, wherein the void of the first disk and the void of the second disk each comprise at least five straight, elongated sections joined end-to-end and oriented at an angle relative to one another to provide at least four turns defining changes in fluid flow direction within the fluid passageway.

5. A device for controlling fluid flow as recited in claim 4, wherein the first disk and the second disk each have a substantially circular shape, each of the first disk and second disk extending in a direction substantially perpendicular to an imaginary axis passing through the center of the disks.

6. A device for controlling fluid flow as recited in claim 5, wherein the first disk and the second disk each further comprise a substantially annular-shaped void, the annular-shaped void of the first disk and the annular-shaped void of the second disk being disposed radially outward relative to the fluid passageway, the annular-shaped void of the first disk and the annular-shaped void of the second disk together defining at least a portion of an acoustic chamber configured to defeat acoustic disturbances generated in the fluid passageway.

7. A device for controlling fluid flow as recited in claim 5, wherein one of the first disk and the second disk comprises a plurality of frequency-shifting passages configured to provide fluid communication between the acoustic chamber and the exterior of the trim disk assembly and to increase the sonic frequency of acoustic disturbances associated with fluid passing through the trim disk assembly.

8. A device for controlling fluid flow as recited in claim 7, further comprising a generally cylindrical gallery surrounding the trim disk assembly and configured to direct fluid flowing out of the trim disk assembly into the fluid outlet, the plurality of frequency-shifting passages being configured to direct fluid passing therethrough from the acoustic chamber to the exterior of the trim disk assembly in a direction generally towards the fluid outlet.

9. A device for controlling fluid flow as recited in claim 5, wherein the first disk and the second disk each further comprise a substantially circular-shaped void centered at the imaginary axis passing through the center of the disks, continuous fluid communication being provided between the substantially circular-shaped void and the exterior of the trim disk assembly through the fluid passageway, the acoustic chamber, and the frequency-shifting passages.

10. A device for controlling fluid flow as recited in claim 1, wherein the fluid passageway comprises a plurality of walls at least partially defined by portions of the first disk adjacent the void of the first disk and portions of the second disk adjacent the void of the second disk, the fluid passageway having an undivided cross-sectional area in a plane substantially perpendicular to at least one of the walls, the cross-sectional area being completely bounded by a plurality of sides defined by the walls of the fluid passageway, two sides of the plurality of sides meeting at a first point defining the vertex of a first angle between the sides meeting at the first point, two of the sides of the plurality of sides meeting at a second point defining the vertex of a second angle between the sides meeting at the second point, the first angle being equal to the second angle, the first angle and the second angle each exceeding 180 degrees.

11. A device for controlling fluid flow as recited in claim 10, wherein the first angle is oppositely oriented relative to the second angle.

12. A device for controlling fluid flow comprising:

a fluid inlet;

a fluid outlet;

a trim disk assembly comprising:

a substantially planar first disk comprising a first major surface and a second major surface, the first disk including an elongated void formed at least partially through the first disk in one of the first major surface and the second major surface thereof;

a substantially planar second disk disposed adjacent the substantially planar first disk, the second disk comprising a first major surface and a second major surface, the second disk including an elongated void formed at least partially through the second disk in one of the first major surface and the second major surface thereof, the void of the second disk having a shape and size substantially similar to a shape and size of the void in the first disk, the second disk being aligned with the first disk to provide fluid communication between the void of the first disk and the void of the second disk, the void of the first disk being offset from the void of the second disk; and wherein the void of the first disk and the void of the second disk together at least partially define a fluid passageway, wherein the first disk and the second disk each have a substantially circular shape, each of the first disk and second disk extending in a direction substantially perpendicular to an axis passing through the center of the disks, and wherein the first disk and the second disk each further comprise a substantially annular-shaped void, the annular-shaped void of the first disk and the second disk being disposed radially outward relative to the fluid passageway, the annular-shaped void of the first disk and the second disk together defining at least a portion of an acoustic chamber configured to defeat acoustic disturbances generated in the fluid passageway.

13. A device for controlling fluid flow as recited in claim 12, wherein one of the first disk and the second disk comprises a plurality of frequency-shifting passages configured to provide fluid communication between an acoustic chamber and the exterior of the trim disk assembly and to increase the sonic frequency of acoustic disturbances associated with fluid passing through the trim disk assembly.

* * * * *